(12) United States Patent
Tamamoto et al.

(10) Patent No.: US 7,320,306 B2
(45) Date of Patent: Jan. 22, 2008

(54) ENGINE REVOLUTION CONTROLLER OF WORKING MACHINE

(75) Inventors: Riyuuhei Tamamoto, Wako (JP); Tadayuki Yoneyama, Wako (JP); Makoto Yamamura, Wako (JP); Mitsuyoshi Kanai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/581,209

(22) PCT Filed: Nov. 19, 2004

(86) PCT No.: PCT/JP2004/017235

§ 371 (c)(1),
(2), (4) Date: Jun. 1, 2006

(87) PCT Pub. No.: WO2005/054666

PCT Pub. Date: Jun. 16, 2005

(65) Prior Publication Data

US 2007/0125341 A1 Jun. 7, 2007

(30) Foreign Application Priority Data

Dec. 2, 2003 (JP) ............................. 2003-403095

(51) Int. Cl.
*F02P 5/15* (2006.01)
*F02D 9/02* (2006.01)
*F02D 43/00* (2006.01)
(52) U.S. Cl. ................... 123/350; 123/406.23
(58) Field of Classification Search ................ 123/335, 123/350–356, 406.57, 406.23
See application file for complete search history.

(56) References Cited

U.S. PATENT DOCUMENTS

| 4,075,989 A * | 2/1978 | Nagasawa ............. 123/406.57 |
| 4,572,150 A * | 2/1986 | Foster ........................ 123/355 |
| 2003/0130785 A1* | 7/2003 | Ishikawa et al. ............ 123/352 |
| 2005/0016498 A1* | 1/2005 | Hartmann et al. ........... 123/350 |

FOREIGN PATENT DOCUMENTS

| JP | 54-152813 U | 10/1979 |
| JP | 61-272472 A | 12/1986 |
| JP | 7-317577 A | 12/1995 |
| JP | 8-121307 A | 5/1996 |

* cited by examiner

*Primary Examiner*—T. M. Argenbright
(74) *Attorney, Agent, or Firm*—Westerman, Hattori, Daniels & Adrian, LLP.

(57) ABSTRACT

In an engine of a working machine having no governor mechanism, the engine revolution speed is controlled such that the revolution speed can stably be maintained irrespective of the variation in load without adjusting the throttle opening to exploit the full potential of the engine. Since an engine 1 does not have the governor mechanism, an operator adjusts the throttle opening and controls the engine revolution speed. A map in which ignition timing (amount of angle of lead) is set by means of functions of the engine revolution speed is stored in an ignition timing map 30. The map 30 is set such that the engine revolution speed is equal to or higher than a value to be controlled (e.g. 7000 rpm), and the ignition timing is lagged as compared with a case in which the engine revolution speed is lower than the value to be controlled.

3 Claims, 7 Drawing Sheets

ENGINE REVOLUTION CONTROLLER OF WORKING MACHINE

TECHNICAL FIELD

The present invention relates to a revolution controller of an internal combustion engine (simply referred to as "engine", hereinafter) for a working machine, and more particularly, to an engine revolution controller for a working machine capable of controlling the engine revolution speed without providing a governor mechanism, or mechanical governor means.

BACKGROUND ART

In an engine for driving a working machine such as a small type general engine, typically, the engine revolution speed is appropriately controlled by using a governor mechanism. As the governor mechanism, there is a known mechanism in which a link mechanism is moved by a centrifugal force suitable for the engine revolution speed, the movement of the link mechanism is transmitted to a throttle valve, and the throttle opening is adjusted. However, since an engine used as a power source such as a handheld mower and a blower is used at relatively high speed rotation, stable control result can not be obtained easily by the conventional governor mechanism, and since it is desired to reduce the working machine in size and weight, the engine is not provided with the governor mechanism in many cases.

In an engine having no governor mechanism, the throttle opening of a carburetor is adjusted manually by an operator, thereby controlling the engine revolution speed. However, since the operator adjusts the throttle opening depending upon his or her feeling or guess, the operator tries to enhance the efficiency of the operation and the engine is tend to be used at revolution speed higher than practically usable revolution speed. Further, in recent years, the engine is set to lean combustion mode with emission control, the maximum revolution speed of the engine itself is set higher, and there is a tendency that the engine revolution speed becomes higher together with the afore-mentioned operator's using state. If the engine revolution speed becomes higher, the operation noise caused by the revolution of the engine is abruptly increased, and this is not preferable in terms of vibration and endurance.

In terms of limiting the maximum revolution speed to a predetermined value or lower, Japanese Patent Application Laid-open No. 7-317577 discloses a working machine in which a throttle valve does not come to a fully opened position by mechanically limiting the pivoting range of a throttle operating lever. Further, Japanese Utility Model Application Laid-open No. 54-152813 discloses a mower in which an end of a throttle lever is provided with an adjusting screw so that the engine revolution speed when the throttle lever is fully opened can be increased and reduced.

Patent Document 1: JP 7-317577 A
Patent Document 2: JP 54-152813 U

DISCLOSURE OF THE INVENTION

Problem to be Solved by the Invention

In the conventional working machine and mower, the range of movement of the throttle operating lever is mechanically limited so that the throttle valve does not come to the fully opened position. Therefore, the engine revolution speed can be limited such that the noise does not reach the limited value. However, since the engine is used in the low output characteristics equal to or lower than the maximum output by limiting the maximum throttle opening, the original performance of the engine cannot fully be utilized.

It is an object of the present invention to solve the above problem, and to provide an engine revolution controller of a working machine capable of utilizing the original performance of the engine as much as possible.

Means for Solving Problem

To achieve the above object, the invention has a first feature in an engine revolution controller of a working machine in which the engine revolution speed is adjusted by operation of a throttle opening operating device without depending on a mechanical governor means to cope with load variation, the engine revolution controller including ignition timing determining means which lags the ignition timing of an engine ignition device to suppress the engine revolution speed from further increasing in a region where the engine revolution speed is equal to or higher than a predetermined revolution speed, thereby substantially keeping the revolution around the predetermined revolution speed without operating the throttle opening operating device with respect to the load variation of the engine.

A second feature of the invention is that an upper limit of the throttle opening is limited to a value closer to a close side than a fully opened position.

A third feature of the invention is that the upper limit of the throttle opening is set such that a no load operating revolution speed of the engine is close to the predetermined revolution speed.

A fourth feature of the invention is that the engine ignition device is a digital control type ignition device which manages ignition timing in correspondence to the engine revolution speed.

Effect of the Invention

According to the first feature, in this engine, the revolution speed is manually controlled using the throttle opening operating device without providing the mechanical governor means, that is, governor mechanism, but the engine revolution speed can be maintained close the preset revolution speed while keeping the throttle opening constantly (for example, fully open) without operating the throttle opening operating device in a region where the engine revolution speed is equal to or higher than the predetermined revolution speed.

When the throttle is fully opened, the revolution speed is maintained at the value closer to the set revolution speed by lagging the ignition timing, but when a load is increased, since the lagged ignition timing is returned to the advanced side, it is possible to cope with the load variation in a state where the predetermined value of the engine revolution speed is maintained. Since it is possible to suppress the increase of the revolution speed while fully opening the throttle, it is possible to sufficiently exhibit the engine ability near the predetermined revolution speed at least. When load is extremely low or there is no load, the engine revolution speed cannot be suppressed only by lagging the ignition timing in some cases. The throttle opening is reduced by the throttle opening operating device only in such a case. With this, it is possible to sufficiently cope with this problem. That is, in a state where a load of a certain value is applied, it is almost unnecessary to adjust the throttle opening.

According to the second feature, the throttle opening is limited to the closer side than the fully opened position. With this, it is possible to carry out the operation without adjusting the throttle opening until the operation state reaches the light load region from the rating operation.

According to the third feature, it is possible to utilize the revolution controller in the same manner as that of the engine revolution controller of a working machine having a governor mechanism. That is, it is possible to maintain the engine revolution speed at substantially constant value only by adjusting the ignition timing without adjusting the throttle opening.

Further, since the upper limit of the throttle opening is limited such that the predetermined revolution speed is set to the substantially no load operation revolution speed, it is possible to rise from the stable operation in the no load operating region swiftly. Thus, although the upper limit of the throttle is limited, the sacrifice of output is small as compared with the conventional throttle opening limitation, and the engine ability can be exhibited effectively.

According to the fourth feature, by setting appropriate ignition timing with respect to the engine revolution speed in accordance with feature of a working machine which is a load in an engine for driving a working machine, that is, a general engine, it is possible to maintain the operation at stable revolution speed with respect to the load variation of the operation.

It is simple to set the change of the ignition timing, and the ignition operation is continued without thinning the ignition or without implementing intermittent ignition even when the output is reduced around the predetermined revolution speed and thus, it is possible to swiftly follow the rise of load.

DESCRIPTION OF THE REFERENCE NUMERALS

1 . . . engine, 2 . . . gearing shaft, 3 . . . centrifugal clutch, 8 . . . carburetor, 9 . . . throttle cable, 9*c* . . . inner wire, 12 . . . throttle shaft, 15 . . . stopper (opening limiting member), 18 . . . throttle lever, 29 . . . revolution speed sensor, 30 . . . ignition timing map

BEST MODE FOR CARRYING OUT THE INVENTION

Figure 2:
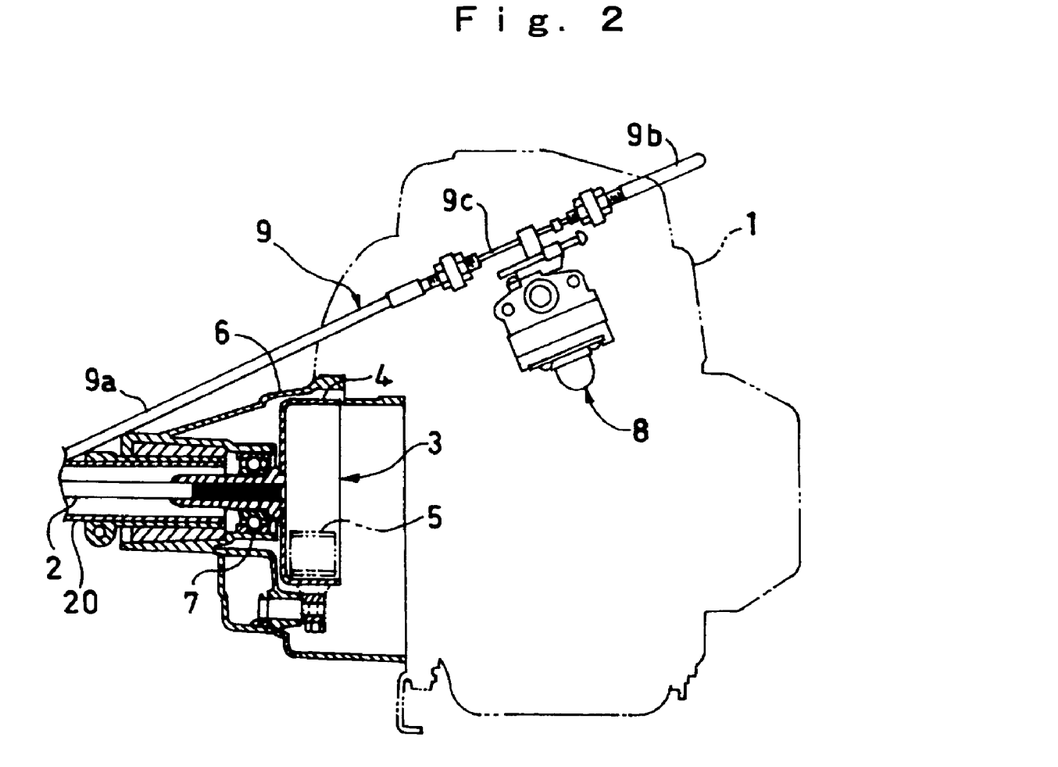
FIG. 2 is a sectional view of an essential portion of a mower suitable to which the engine revolution controller of the working machine of the embodiment of the invention can suitably be applied.
Figure 3:
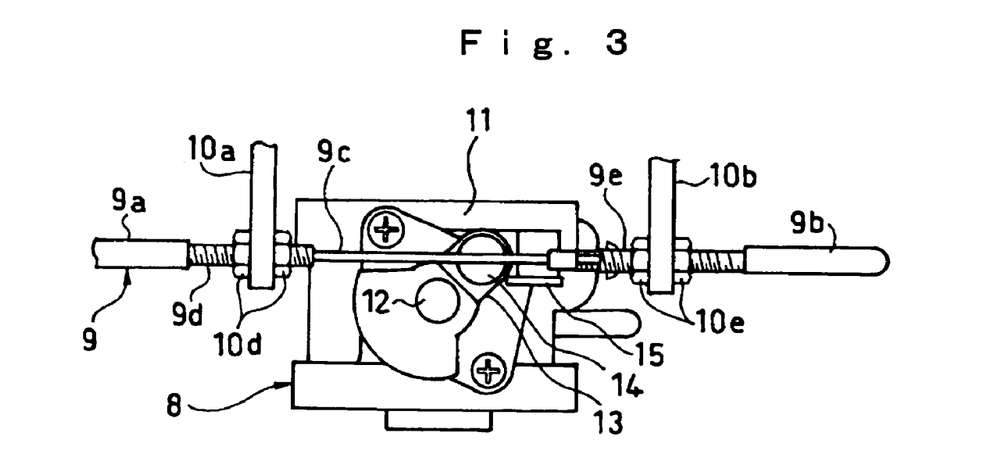
FIG. 3 is a plan view of an essential portion of a carburetor provided in the mower.
Figure 8:
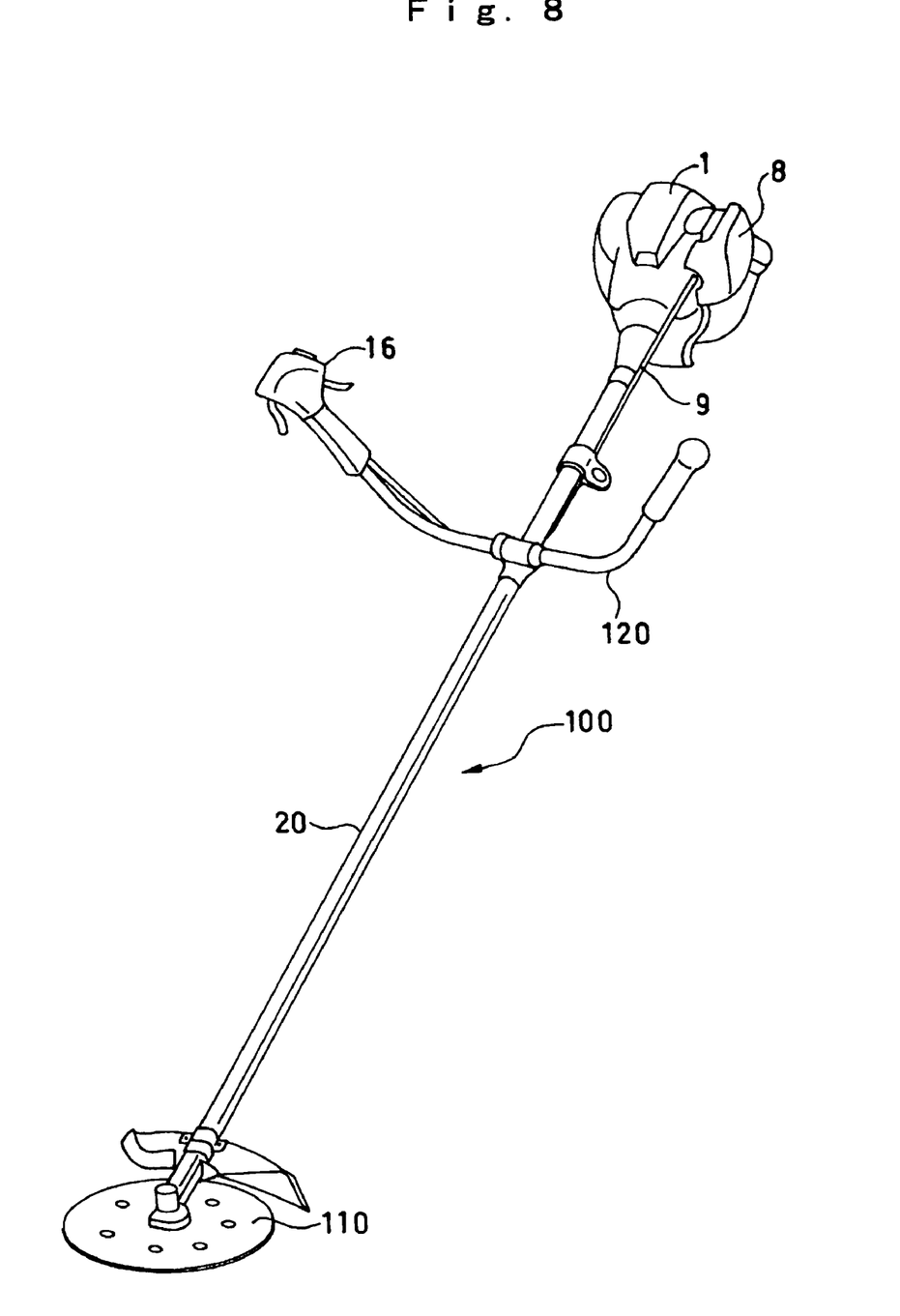
FIG. 8 is a perspective view of a mower.

An embodiment of the present invention will be explained in detail with reference to the drawings. FIG. 8 is a perspective view of a mower having an engine including a revolution controller according to the embodiment of the invention. FIG. 2 is a sectional view of a front portion of the engine. FIG. 3 is a plan view of a carburetor. In FIG. 8, the mowing machine 100 includes an engine 1, an operating sleeve 20 which extends from the engine 1 and which is provided at its tip end with a cutting blade 110, a handle 120 provided at an intermediate portion of the operating sleeve 20, and an operating device 16 which is provided on a right side end of the handle 120 and which also functions as a grip. The mowing machine 100 further includes a throttle cable 9 extending from the operating device 16 to a carburetor 8 of the engine. The engine 1 is a small sized (for example, displacement of 25 cm$^3$) air-cooled four stroke single-cylinder engine which is suitable for the mowing machine 100.

In FIGS. 2 and 3, a transmission shaft 2 passes through the transmission sleeve 20 and extends from the engine 1 to the cutting blade 110. The transmission shaft 2 is connected to a crankshaft (not shown) of the engine 1 through a centrifugal clutch 3. The centrifugal clutch 3 includes a bottomed drum 4 having an inner surface which comes into contact when a weight (not shown) mounted on the crankshaft is displaced outward by a centrifugal force. One end of the transmission shaft 2 is connected to a bottom of the drum 4. The drum 4 is supported by a bearing 7 with respect to the clutch case 6. A brake shoe 5 is rotatably supported by the clutch case 6 which is pushed against an outer periphery of a drum 4 and brakes. The transmission shaft 2 extends to the cutting blade 100 in the operation sleeve 20 which is coupled to the clutch case 6.

A carburetor 8 is mounted on a side of the engine 1. A throttle cable 9 is engaged with the carburetor 8. The throttle cable 9 includes a first outer tube 9*a* extending to a throttle lever (later-described) along the operation sleeve 20, a second outer tube 9*b* extending from the carburetor 8 in a direction opposite to throttle lever, and an inner wire 9*c*. The first and second outer tubes 9*a* and 9*b* are respectively fixed to brackets 10*a* and 10*b* extending from the side of the engine 1. Screws 9*d* and 9*e* are formed on ends of the first outer tube 9*a* and the second outer tube 9*b*, respectively, and the brackets 10*a* and 10*b* are fastened and fixed by double nuts 10*d* and 10*e*. One end of the inner wire 9*c* is fixed to the throttle lever, and the other end is connected to the brake shoe 5 through a link mechanism (not shown).

The carburetor 8 includes a case 11, a throttle shaft 12 mounted on a throttle valve (not shown), a throttle arm 13 mounted on the throttle shaft 12, and a wire-connecting section 14 turnably mounted on an end of the arm 13. When the throttle arm 13 turns in the counterclockwise direction in FIG. 3, its end surface comes into abutment against a stopper 15 so that the fully opened position of the throttle valve is limited. The inner wire 9*c* is fixed to the connecting section 14, and when the inner wire 9*c* is pulled by the throttle lever, the throttle arm 13 rocks around the throttle shaft 12 and the throttle shaft 12 turns. As the throttle shaft 12 turns, an end of the inner wire 9*c* is operated such that the brake shoe 5 is released from the drum 4 through the link mechanism.

That is, as the throttle valve is opened, the braking force of the drum 4, that is to say, the transmission shaft 2 fixed to the drum 4 is released.

Figure 4:
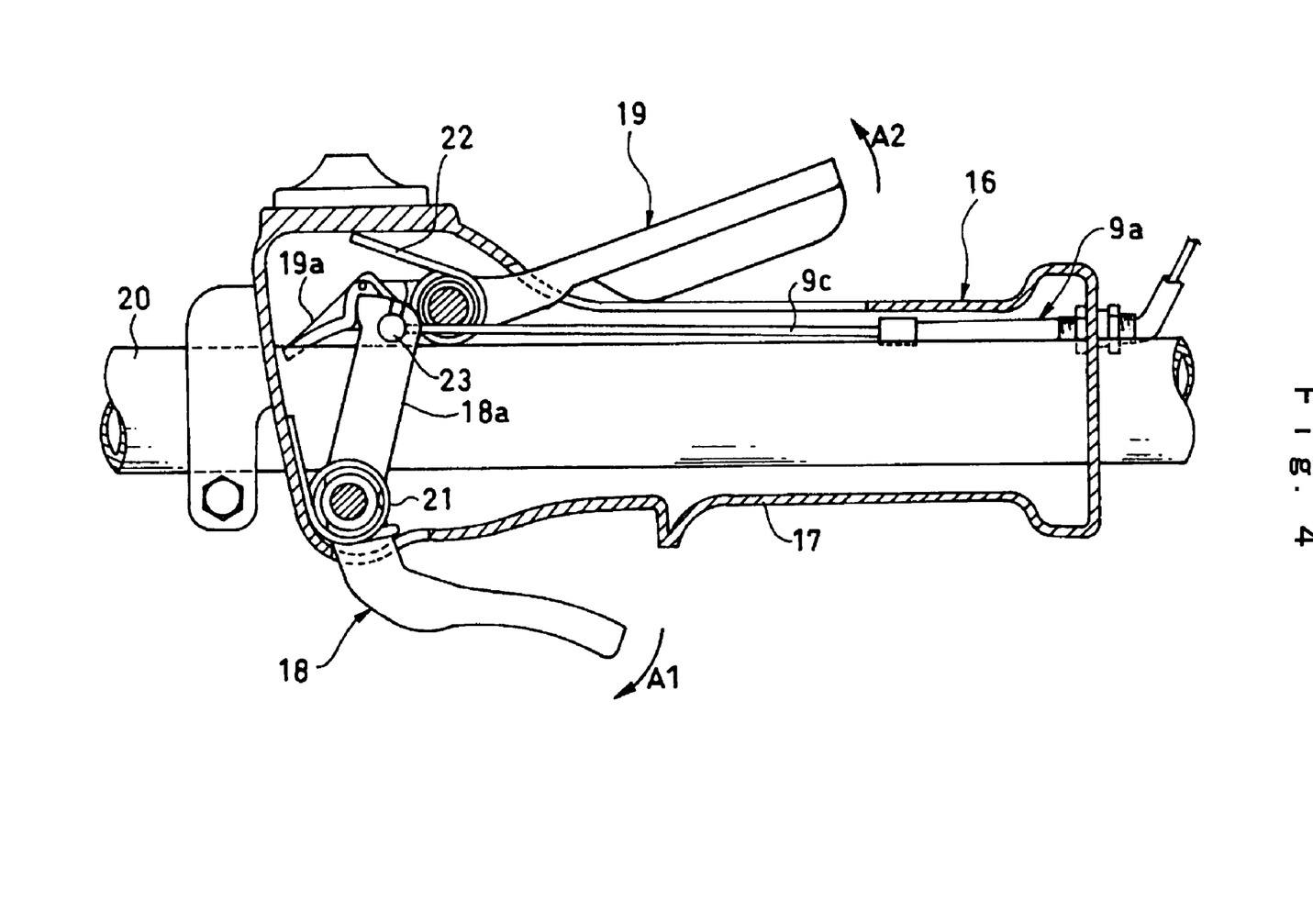
FIG. 4 is a sectional view of a throttle opening operating device.

FIG. 4 is a sectional view of an operating device including the throttle lever. The operating device 16 includes a handle case 17, a throttle lever 18 supported by the handle case 17 such that the throttle lever 18 can rock, and a lock lever 19 pivotally supported by the handle case 17 for locking the throttle lever 18. The throttle lever 18 and the lock lever 19 are actuated in the directions of arrows A1 and A2 by springs 21 and 22, respectively. The throttle lever 18 includes an arm 18a extended for connecting the wire. One end of the inner wire 9c is mounted to the arm 18a by a mounting member 23. During the operation, an operator holds the lock lever 19 with his or her hand together with the handle case 17, and releases the engagement between the tip end of the arm 18a and the tip end 19a of the lock lever 19. If the operator holds the throttle lever 18 together with the handle case 17, the inner wire 9c is pulled by the throttle lever 18, the throttle shaft 12 turns and the throttle valve is opened. If the operator loosens his or her hold of the throttle lever 18, the throttle lever 18 is turned and returned in the direction of the arrow A1 by the spring 21, and the inner wire 9c moves in a direction to close the throttle valve.

Figure 1:
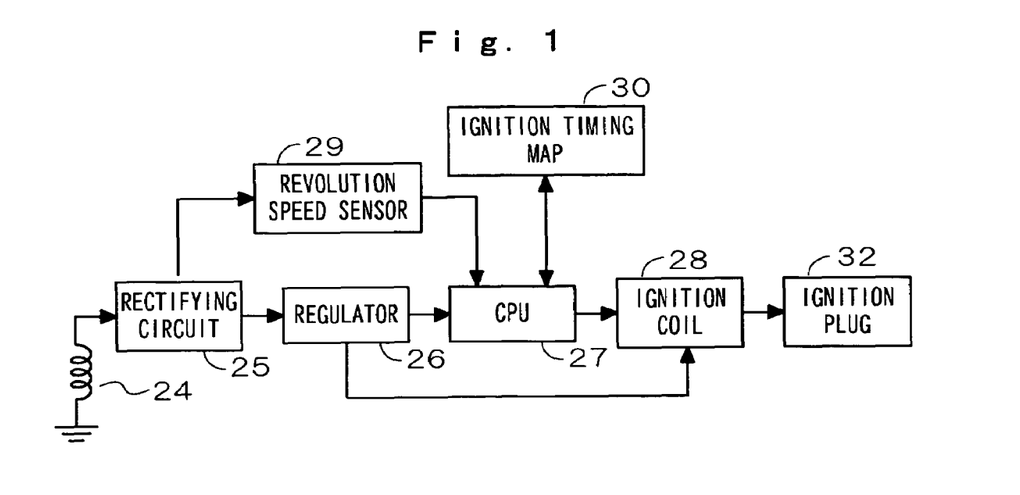
FIG. 1 is a block diagram showing a configuration of an engine revolution controller for a working machine according to an embodiment of the present invention.

FIG. 1 is a diagram showing a configuration of the engine revolution controller. An output shaft of the engine 1 is connected to a flywheel power generator which is driven by the engine 1. A power generating coil 24 of the flywheel power generator outputs current, and the current is rectified by a rectifying circuit 25. The rectified current is inputted to a regulator 26 and is adjusted into predetermined voltage. That is, the regulator 26 adjusts output voltage of the coil 24 such that the voltage is suitable as operating voltage of a CPU 27 and as primary voltage of an ignition coil 28.

A revolution speed sensor 29 outputs a pulse signal every time when the power generator rotates once based on waveform after rectified by the rectifying circuit 25. The CPU 27 calculates the frequency of the power generator, namely, a value representing the revolution speed of the engine 42 based on the period of the pulse signal. The engine starting apparatus is provided with an ignition timing map 30. In the ignition timing map 30, the ignition timing (shown with crank angle) is set related to the engine revolution speed calculated by the CPU 27 based on the output pulse of the revolution speed sensor 29. The CPU 27 retrieves the ignition timing map 30 and reads the ignition timing corresponding to the input engine revolution speed. The CPU 27 may be structured to calculate the ignition timing using functions of preset engine revolution speed instead of retrieving the map. In any cases, the relation between the engine revolution speed and the ignition timing is calculated digitally using digital data.

The crank angle of the engine 1 can be detected by adding a constant determined in correspondence with the disposition position of the revolution speed sensor 29 to output pulse timing of the revolution speed sensor 29. The CPU 27 outputs the ignition instructions to the ignition coil 28 when the crank angle which is read from the ignition timing map 30 and the current crank angle which is detected with output pulse timing of the revolution speed sensor 29 coincide with each other. Responding to the ignition instructions, the ignition coil 28 generates high voltage in a secondary coil connected to an ignition plug 32 and ignites the ignition plug 32.

Figure 5:
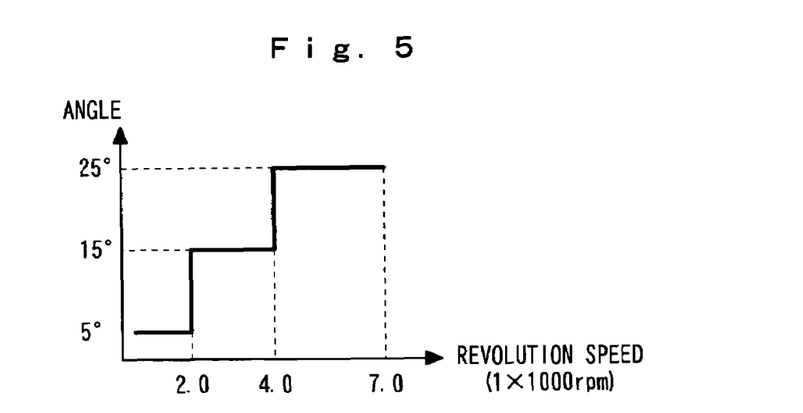
FIG. 5 is a diagram showing one example of an ignition timing map.

FIG. 5 shows one example of an ignition timing map. As shown in FIG. 5, the ignition timing is determined to advance the angle in stages as the engine revolution speed is increased. The advanced angle is shown with a crank angle from the top dead center as a reference. The maximum advanced angle is set to 25°. When the engine revolution speed reaches the predetermined switching revolution speed (7,000 rpm in this example), the advanced angle is lagged to 5°. By lagging the ignition timing when the revolution speed reaches the predetermined value, it is possible to appropriately maintain the engine revolution speed as will be explained concretely next.

Figure 6:
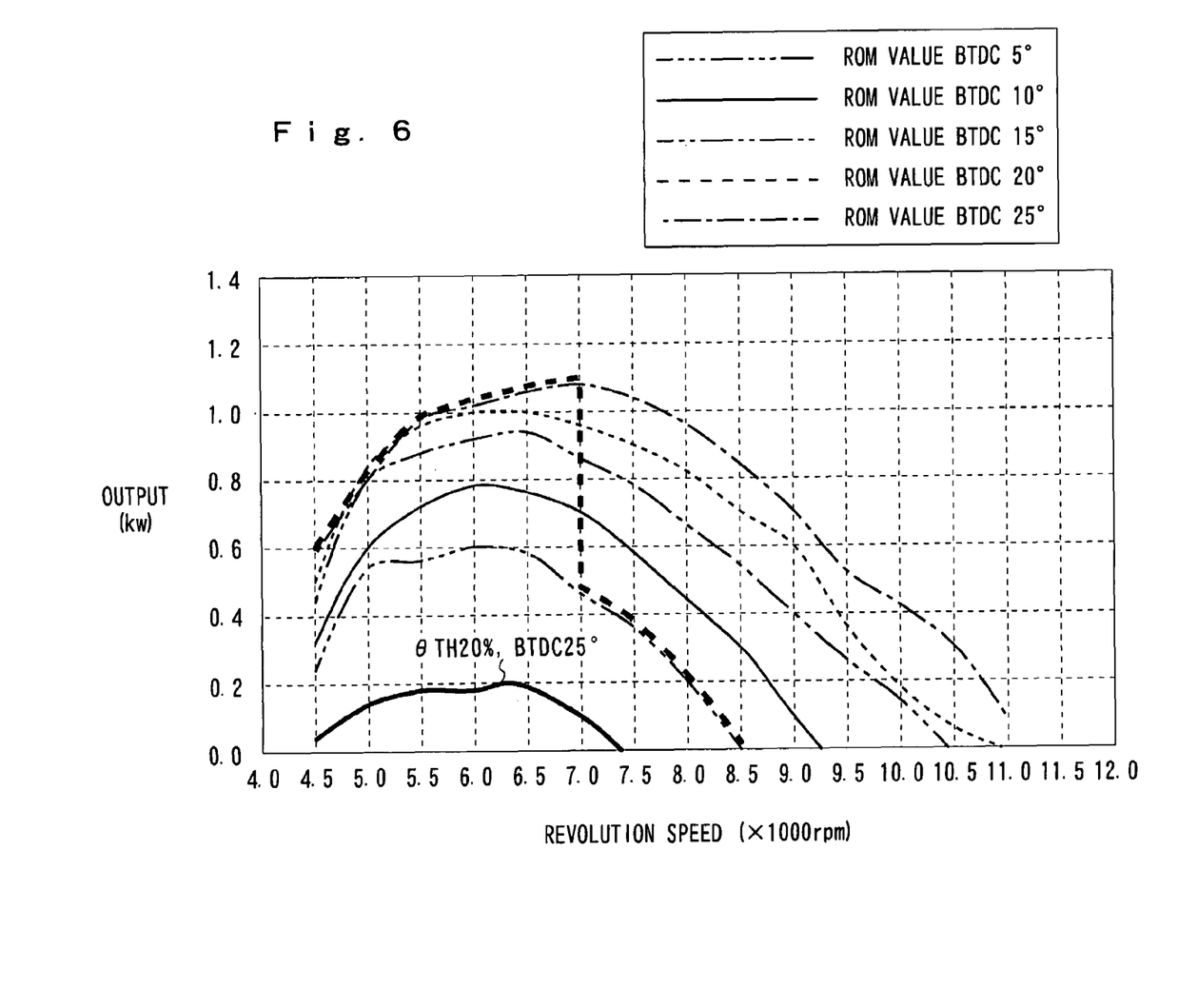
FIG. 6 is a characteristic diagram showing a relation between the engine revolution speed and the engine output in every ignition timing when the throttle opening of a first embodiment is fully opened.

FIG. 6 is a characteristic diagram showing a relation between the engine revolution speed and the engine output in every ignition timing when the throttle is fully opened. It can be understood from FIG. 6 that as the ignition timing is closer to the lagged side angle, there is a tendency that the output and the revolution speed are reduced. In an engine having such characteristics, when the engine revolution speed is increased to 7,000 rpm during operation in which the ignition timing is at BTDC (before top dead center) 25° and the opening of the throttle valve (simply referred to as "throttle opening", hereinafter) is set fully open, the ignition timing is lagged to BTDC 5° in accordance with the ignition timing map. Although the output is reduced due to the lagging of an angle, since the engine revolution speed is suppressed to 7,000 rpm, the revolution speed is maintained at 7,000 rpm only if it is known that the load is about 0.5 KW or higher even if the throttle is fully open.

For example, when the mower is using in a place having high load, for example, a place where weeds are overgrowing, the throttle is fully opened and the engine is operated at high output. In the case of a conventional device, if the amount of weeds is small and the load is light, the engine revolution speed is increased and the engine noise is increased and thus, it is necessary to reduce the throttle opening in a normal state.

According to the embodiment, on the other hand, the operation can be continued in a state where the throttle is left fully opened. Therefore, if the load is increased and the engine revolution speed becomes equal to 7,000 rpm or less, the advanced angle of the ignition timing is returned to 25° in accordance with the map shown in FIG. 5 and thus, high output can be obtained. Since the mowing operation in which load may be varied can stably be carried out while leaving the throttle in its fully opened state, it is possible to largely reduce the operation labor. The manual operation is carried out to reduce the throttle opening where a load is obviously reduced or there is almost no load. With this, the revolution speed where there is almost no load can stably be maintained.

In order to maintain the engine revolution speed at about 7,000 rpm by adjusting the throttle opening while keeping the ignition timing at BTDC 25°, it is necessary to reduce the throttle opening by 80%. Characteristics in which the throttle opening is reduced by 80% are shown with note of throttle opening θTH 20% in FIG. 6. According to the characteristics, it is understood that the output is largely reduced as compared with a case where the ignition timing is lagged by the advanced angle of 5°. With this, since there is no margin of output, it is not possible to follow even if the throttle is abruptly opened when the load is again increased abruptly, and this may cause engine stall, and sufficient operation can not be carried out.

A second embodiment will be explained. As afore-mentioned the maximum throttle opening is suitable for operation under relatively high load. For light load operation, it is necessary to lag the ignition timing in accordance with the revolution speed and to limit the maximum throttle opening. It is possible to limit the throttle opening by changing relative positions of the stopper 15 provided on the carburetor 8 and the throttle arm 13.

Figure 7:
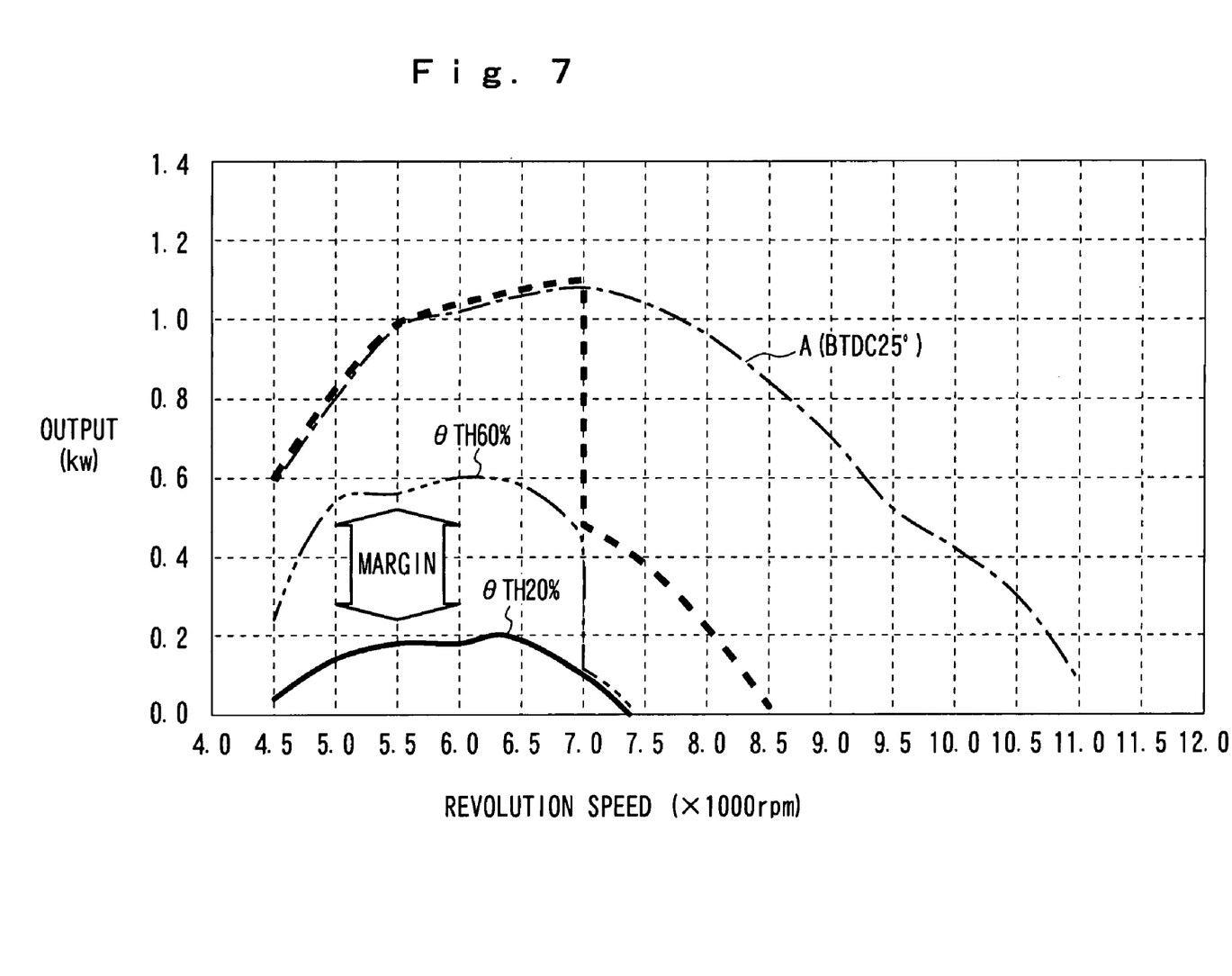
FIG. 7 is a characteristic diagram showing a relation between the engine revolution speed and the engine output in every ignition timing when the throttle opening of a second embodiment is fully opened.

FIG. 7 shows characteristics when the throttle opening is limited. In FIG. 7, when the throttle opening is limited to 60% and the output is reduced by 40% (throttle opening θTH is 60%), the output is reduced as compared with the characteristic A in which the throttle opening is fully opened, but this case still has a margin of output as compared with the conventional case in which the throttle opening is reduced by 80% (throttle opening θTH is 60%) to maintain the engine revolution speed at 7,000 rpm. Thus, in this margin range, the operation can be carried out stably. That is, it is possible to effectively utilize the original ability of the engine by selecting appropriate setting in accordance with the working machine.

The limit position of the throttle opening is not limited to a fixed position, and a limit position suitable for a load may be set. A position of the stopper 15 provided on the carburetor 8 may be changed, and this stopper may be replaced by another stopper 15 having different size.

Figure 9:
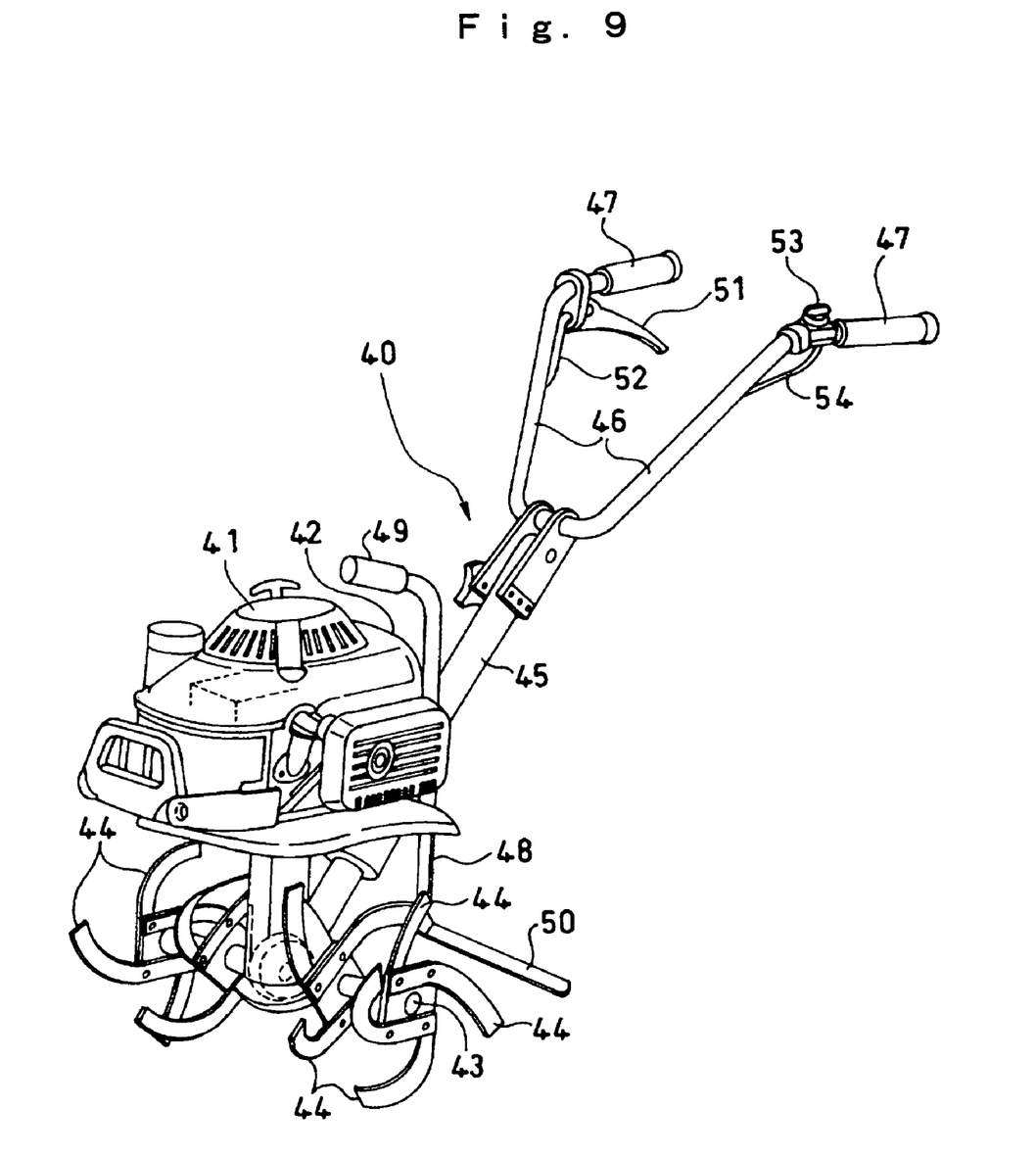
FIG. 9 is a perspective view of a tiller.

The working machine engine including the revolution controller can be applied not only to the mower but also to a tiller. FIG. 9 is a perspective view of a tiller which is a second example of the working machine having an engine to which the engine starting apparatus of the embodiment of the invention can be applied. The tiller 40 is provided with an engine 42 having a vertical shaft output. The engine 42 includes a recoil starter 41. Output of the engine 42 is transmitted to an operator shaft 43 located below the engine 42. A plurality of cultivating claws 44 are mounted on the operator shaft 43. A handle post 45 extends from a frame of the engine 42 rearward and upward. A tip end of the handle post 45 is bifurcated to form a handle 46. Tip ends of the handle 46 are provided with grips 47 and 47. The handle post 45 is provided with a vertically extending post 48. The post 48 is provided at its upper end with a grip 49 which is used for bringing the tiller 40 upward and carrying the same. A lower end 50 of the post is used as a resistant rod for adjusting the cultivating height.

The right handle is provided with a throttle lever 51. A throttle cable 52 is connected to the carburetor (not shown). The grip 47 of the left handle is provided with an engine stop switch 53. A switch cord 54 pulled out from the engine stop switch 53 is connected to a fuel cut device and an ignition stop device provided in the engine 42.

According to the tiller 40, since the cultivating claw also functions as a wheel and the tiller 40 moves forward while cultivating using the working claw, the load variation of the engine is large. Further, the tiller 40 is used in an operation environment in which an operator must largely adjust the load amount by pulling or pushing the handle in accordance with the surrounding earth-condition. Therefore, the above-described revolution controller capable of stably maintaining the revolution speed irrespective of the load variation is extremely suitable as an engine revolution controller for a working machine.

Although the present invention is applied to the engine of a tiller or mower in the embodiment, the invention is not limited to this, and the invention can widely be applied to engine for driving working machine of a type in which a governor mechanism is not provided, and the revolution speed is adjusted by operation of a throttle opening operating device.

The invention claimed is:

1. An engine revolution controller of a working machine in which the engine revolution speed is adjusted by operation of a throttle opening operating device without depending on mechanical governor means to cope with load variation, the engine revolution controller comprising ignition timing determining means which lag the ignition timing of an engine ignition device to suppress the engine revolution speed from further increasing in a region where the engine revolution speed is equal to or higher than a predetermined revolution speed, thereby substantially keeping the predetermined revolution speed without operating the throttle opening operating device with respect to the load variation of the engine;

wherein an upper limit of the throttle opening is limited to a value closer to a close side than a fully opened position.

2. The engine revolution controller of the working machine according to claim 1, wherein the upper limit of the throttle opening is set such that a no load operating revolution speed of the engine is close to the predetermined revolution speed.

3. The engine revolution controller of the working machine according to any one of claims 1 or 2, wherein the engine ignition device is a digital control type ignition device which manages ignition timing in correspondence with the engine revolution speed.

\* \* \* \* \*